(12) United States Patent
Peichl et al.

(10) Patent No.: US 8,009,116 B2
(45) Date of Patent: Aug. 30, 2011

(54) DEVICE FOR TWO-DIMENSIONAL IMAGING OF SCENES BY MICROWAVE SCANNING

(75) Inventors: Markus Peichl, Gauting (DE); Stephan Dill, München (DE); Matthias Jirousek, Starnberg (DE); Dominik Berthel, Stadelschwarzach (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 373 days.

(21) Appl. No.: 12/380,962

(22) Filed: Mar. 5, 2009

(65) Prior Publication Data

US 2009/0224993 A1 Sep. 10, 2009

(30) Foreign Application Priority Data

Mar. 6, 2008 (DE) .................. 10 2008 013 066

(51) Int. Cl.
*H01Q 3/12* (2006.01)
*H01Q 3/00* (2006.01)
*H01Q 19/10* (2006.01)
*H01Q 13/00* (2006.01)

(52) U.S. Cl. ........ 343/757; 343/761; 343/763; 343/765; 343/766; 343/839; 343/781 CA; 342/360

(58) Field of Classification Search .................. 343/761, 343/839, 781 CA, 763, 765, 766; 342/360
See application file for complete search history.

(56) References Cited

U.S. PATENT DOCUMENTS

| | | | |
|---|---|---|---|
| 3,209,352 A * | 9/1965 | Buck et al. | 342/64 |
| 4,305,075 A | 12/1981 | Salvat et al. | |
| 5,777,573 A * | 7/1998 | Klausing et al. | 342/25 F |
| 6,259,414 B1 * | 7/2001 | Lettington | 343/757 |
| 6,943,742 B2 | 9/2005 | Holly | |
| 2008/0211713 A1 | 9/2008 | Jeck | |

FOREIGN PATENT DOCUMENTS

EP 0 002 982 7/1979

(Continued)

OTHER PUBLICATIONS

Martin et al., "High resolution passive millimeter-wave security screening using few amplifiers," Proc. of SPIE, vol. 6548, 2007, pp. 654806-1 to 654806-10.

*Primary Examiner* — Jacob Y Choi
*Assistant Examiner* — Graham Smith
(74) *Attorney, Agent, or Firm* — Collard & Roe, P.C.

(57) ABSTRACT

For two-dimensional imaging of scenes through continuous passive or active microwave scanning, use is made of a fully mechanized directional antenna array comprising a main reflector (1), a primary radiator array (3) and a subreflector (2) having a small size in comparison to the main reflector and being tilted relative to the optical axis (7) of the directional antenna array. First drive means (8) are operative to rotate the subreflector (2) about the optical axis (7), and second drive means (17,18) are operative to move the total directional antenna array in a direction approximately vertical to the optical axis (7). The moving speed of the subreflector (2) is very high in comparison to that of the total directional antenna array. The shape of the main reflector (1), the shape of the subreflector (2), the primary radiator (3), the distance between primary radiator and subreflector and the distance between subreflector and main reflector as focusing parameters are attuned to each other in such a manner that, for a given scene distance, an optimum focusing and an optimum size of the field of view are achieved. The focusing parameters and the moving speeds of the two drive means are set in a manner allowing for a gapless, continuous scanning of the scene with the aid of the focusing spot (12) moving at the scene distance. Applicability in remote investigation, particularly in earth observation and in safety technology.

19 Claims, 6 Drawing Sheets

FOREIGN PATENT DOCUMENTS

| EP | 0 514 886 | 11/1992 |
| WO | WO 2005/017559 | 2/2005 |
| WO | WO 2005/085903 | 9/2005 |
| WO | WO 2007/028472 | 3/2007 |

* cited by examiner

DEVICE FOR TWO-DIMENSIONAL IMAGING OF SCENES BY MICROWAVE SCANNING

CROSS REFERENCE TO RELATED APPLICATIONS

Applicant claims priority under 35 U.S.C. §119 of German Application No. 10 2008 013 066.4 filed on Mar. 6, 2008.

FIELD OF THE INVENTION

The invention relates to a device for two-dimensional imaging of scenes, e.g. of terrain, objects or persons, through continuous microwave scanning by use of a fully mechanized, movable reflector-type directional antenna array configured as a dual-reflector antenna, said directional antenna array comprising a rotationally symmetrical main reflector, a primary radiator assembly including one or a plurality of primary radiators and being arranged in the symmetry axis—coinciding with the optical axis of the directional antenna array—of the main reflector, and said directional antenna array further comprising a rotationally symmetrical subreflector having small dimensions relative to the main reflector, the symmetry axis of said subreflector being inclined relative to the optical axis of the directional antenna array, there being provided first drive means operative to cause said subreflector which is inclined relative to the optical axis of the directional antenna array, to rotate in its vertex about the optical axis of the directional antenna array, and second drive means operative to cause a movement of the whole directional antenna array in a direction at least approximately vertical to the direction of the optical axis of the directional antenna array, and there being provided, on the receiving side, an evaluation unit for generating an image of the scene from the received microwaves.

Passive imaging systems in the microwave range (1-300 GHz), so-called MW radiometers, are highly sensitive and frequency-selective power measuring devices which are useful for detection of the natural thermal radiation behavior of matter having a physical temperature above 0° Kelvin. This power is expressed in brightness temperatures.

If the measurement of brightness temperature distribution is performed by use of an antenna or antenna structure with high spatial resolution, said distribution can be detected in a position-related manner and thus also be captured as an image. In the process, as known, the size of the antenna or antenna structure will determine the spatial resolution which is characterized substantially by the width of the principal maximum of the antenna diagram. In principle, for image generation, the antenna diagram can now be mechanically or electronically rotated across the scene which is to be observed. The image pickup time length for a corresponding image quality will depend on the size of the scene to be imaged, the spatial resolution, the possible dwelling time for an individual resolution cell and the sensitivity of the radiometer receiver. In cases where a plurality of receivers can be used simultaneously, a corresponding reduction of the image pickup time length is possible.

In the same manner, also an active imaging system, i.e. a radar, can be operated, wherein, in each position of the antenna diagram, one signal will be transmitted and be received again. Thus, in addition to the lateral back-scatter cross-section distribution, also the corresponding distance information can be detected.

STATE OF THE ART

In the devices that have been developed so far in the above regard, the two-dimensional imaging of scenes is performed by use of fully mechanized or fully electronic rotating methods, or by use of hybrid forms including both of said rotating methods. Mostly, to obtain a sufficient spatial resolution, it is required to operate in the millimeter wavelength range (e.g. >30 GHz).

With the fully mechanized systems known as of yet, it is not possible, for obtaining a sufficient image size, to reach high enough image rates (e.g. in the range of 1 Hz or better) with sufficient spatial resolution (e.g. an angular resolution of 0.5°) and sensitivity (e.g. 1 K). Mostly, large antenna structures have to be mechanically moved at a fast speed, which will inevitably lead to mass inertia problems. Consequently, basic limits of such methods will be reached quite early (e.g. angular resolution>1°, image rates<<1 Hz, sensitivity>1 K). In the methods known in this regard, a high image rate requires a low angular resolution, and vice versa.

Further still, it has to be noted that present-day fully mechanized imaging systems, when used in the micro/millimeter wavelength range, are not capable to accomplish a high spatial resolution while simultaneously offering a high image rate and sufficient sensitivity. An imaging scanning system for fully mechanized operation is known, for instance, from the article by C. A. Martin et al.: "High-resolution passive millimeter-wave security screening using few amplifiers", SPIE Defense & Security Symposium, Passive MMW Imaging Technology X, Orlando, Fla., USA, Apr. 9-13, 2007, Proceedings of the SPIE, Volume 6548, pp. 654806 et seqq.

Presently, only very few embodiments exist of fully electronic two-dimensional rotating variants. Applicable methods are the phased-array principle, the method of aperture synthesis, the focal plane array principle or, generally, methods with digital beamforming. What all of these methods have in common is the need for a large number of antenna and respectively receiver elements (or at least parts thereof) which, further, have to be integrated in a compact manner. In addition to the extra hardware expenditure, one will often have to tolerate restrictions in the size of the field of view and in sensitivity, as well as problems in scanning. In addition to an increased power consumption, increased mass and difficulties in the dissipation of lost heat, it will often be required to process an immense data flow.

Further, the image reconstruction from the measurement data and the calibration of these systems will cause considerable expenditure because, due to the large number of subsystems, there is an increased complexity of possible error sources which, however, have to be corrected. Also a failure of individual subsystems due to said complexity is not an uncommon occurrence. Nonetheless, it is possible in this manner to reach high image rates and high spatial resolutions as well as moderate sensitivities (e.g. several Hertz and <<0.5° and <1 K). In most cases, however, such systems do require a high technical expenditure with resultant high costs. An imaging system for fully electronic operation is known e.g. from WO 2005/085903 A1.

The most frequently used concepts nowadays are those of the hybrid type wherein a part of the beam rotation is performed mechanically and another part is performed electronically. This concept, although reducing the hardware expenditure, is still in need of a relatively large number of partial systems (antennae, receiver). Here, apart from the difficulties outlined above with respect to fully electronic systems, additional problems may occur during the adaptation of the partial images. Nonetheless, with high expenditure in spite of hybrid technology, there can still be reached a high imaging quality under the aspects of image rate, spatial resolution and sensitivity (e.g. 25 Hz and 0.2° and <2 K). A hybrid imaging system is known e.g. from WO 2005/017559 A2.

Thus, in the above context, it is to be stated that fully electronic imaging systems or hybrid systems with mechanical and electronic rotation of the directional diagram in the micrometer/millimeter wavelength range, although at least partially or approximately capable of effecting a high spatial resolution with simultaneous high image rate and sufficient sensitivity, will require, for this purpose, a high expenditure with regard to hardware, data pick-up and image processing.

Difficulties are encountered particularly in connection with the calibration and the error correction of the systems because a large number of partial systems have to be attuned to each other. The increased hardware expenditure clearly finds its equivalent in an increase of costs and weight and in the occurrence of a massive power loss. Further, in many system solutions, a fully polarimetric operation is difficult or complex or even impossible.

Frequently, at present, systems are proposed which are operative in the sub-millimeter and THz range (>300 GHz) since such systems are adapted to reach much lower wavelengths and thus a higher spatial resolution with the same antenna size. These systems, however, when compared to the classical millimeter wavelength range ($\leqq$300 GHz), suffer from the disadvantages of a smaller penetration depth, increased atmospheric damping, deteriorated noise figures and increased technological complexity of the receivers (e.g. cooling), with a resultant restriction of their range of applications. An imaging system operative in the THz region is known e.g. from U.S. Pat. No. 6,943,742 B2.

Known from WO 2007/028472 A1 are a method and a device for the imaging of test objects, particularly in order to check persons for suspicious objects, by means of electromagnetic waves. Here, the test object is irradiated with electromagnetic waves. The waves reflected back from the test object are received and are evaluated for a pictorial representation of the test object according to the principle of synthetic aperture (SAR). A synthetic aperture is generated in that the waves emitted from a primary radiator of a dual-reflector antenna will first be bundled, wherein the site of maximum bundling, i.e. the focusing spot, will be moved along a circle on a rotational-symmetrical, conical main reflector. Said circular movement is generated by the inclined rotating subreflector. The site of maximum concentration, i.e. the focusing spot on the conical main reflector, has such a small extension that it can be considered as a virtual antenna which is generating, in the far field, a bundle of rays having a large, diverging opening angle. This large, diverging opening angle is effective, with the aid of SAR algorithms to be processed, to generate a required resolution. The antenna beam with the large opening angle will scan the test object along a circular path. Additionally, the whole radar antenna system will be moved linearly so that the test object will, on the whole, be scanned two-dimensionally across its surface area. Of importance in this known imaging method is the use of a two-dimensional SAR method which can be realized by the use of a movable virtual antenna. Thus, as a precondition, there will always have to be an active imaging system with microwave transmitter and receiver corresponding to the SAR radar principle. Passive imaging according to the principle of the so-called microwave radiometer cannot be performed by said known method. Of particular disadvantage in this known imaging method are the considerable computational processing expenditure and the coherence expenditure, both of them being always required in an SAR evaluation. In this known imaging device, it is therefore important that the focusing spot will take a position on the main reflector and that, from there, a bundle of rays with a large opening angle will be emitted. This wide-opened bundle of rays is indispensable for the SAR evaluation provided in the known method.

SUMMARY OF THE INVENTION

It is an object of the invention to provide a device which, by means of active or passive microwave scanning, is capable of imaging large fields of view and thus scenes in a short time and with acceptable image quality, without the high processing expenditure and expenditure for coherence as required in SAR evaluation, while using a minimum number of components, with said components further being of a simple configuration, thus making it possible to keep the costs, the constructional expenditure and the weight as low as possible.

According to the invention, which relates to a device for two-dimensional imaging of scenes of the initially mentioned type, the above object is achieved in that the shape of the main reflector, the shape of the subreflector, the primary radiator, the distance between primary radiator and subreflector and the distance between subreflector and main reflector as focusing parameters for passive or active microwave scanning are attuned to each other in such a manner that, for a given scene distance, an optimum focusing and an optimum size of the field of view are obtained, that the two drive means are configured relative to each other in such a manner that the moving speed of the subreflector relative to the moving speed of the whole directional antenna array is very high, that the focusing parameters and the moving speeds of the two drive means are set to effect a gapless, continuous scanning of the scene with the aid of a focusing spot moving, at the respective scene distance, in a trajectory which is combined from a trajectory resulting from the rotation of the subreflector and a trajectory resulting from the movement of the directional antenna array transversely to the optical axis thereof and which at least approximately has the shape of a twisted cycloid, and that the evaluation unit provided on the receiving side is configured in such a manner that, in the evaluation unit, as a consequence of the determinability and thus of the knowledge of the trajectories of the focusing spot in the scene, the obtained image data are picked up synchronously with the position and are stored, and—online or offline—are unified into an image and are represented or further processed.

The shape of the main reflector, the shape of the subreflector, the primary radiator, the distance between primary radiator and subreflector and the distance between subreflector and main reflector as focusing parameters are attuned to each other in such a manner that, for a given scene distance, an optimum focusing and size of the field of view are obtained. The focusing parameters and the moving speeds of the two drive means are set in such a way that a gapless, continuous scanning of the scene is obtained with the aid of a focusing spot moving, at the respective scene distance, in a trajectory which is combined from a trajectory resulting from the rotation of the subreflector and a trajectory resulting from the movement of the directional antenna array transversely to the optical axis thereof and which at least approximately has the shape of a twisted cycloid.

Thus, the present invention proposes a fully mechanized imaging system for two-dimensional imaging, which system is obtained by using, as a focusing optics for electromagnetic waves, a combination of a main reflector, a subreflector arranged for rotary movement and inclined relative to the optical axis, and a feed antenna. The combination of said three assemblies will be referred to hereunder as the total assembly. In case of a fixed and symmetrically oriented—i.e. non-inclined—subreflector, such an assembly is also called a Cassegrain antenna or Gregory antenna.

Directional antenna arrays of the two-reflector type comprising a rotating subreflector inclined relative to the optical axis are known, for instance, from EP 0 514 886 A1 and EP 0 002 982 A1. However, they do not serve for two-dimensional imaging of scenes, e.g. of terrain, objects or persons, but are provided for so-called conical scanning, primarily in connection with tracking processes.

In the inventive device for two-dimensional imaging of scenes, the subreflector, which relative to the main reflector is of a small size, will be moved in a convenient manner, e.g. by means of a fast-rotating miniaturized motor, whereby the illuminated region on the main reflector will be locally changed by use of the rotational symmetry, i.e. the illuminated region will also be rotated, for instance. Thereby, the antenna diagram of the total assembly will also describe a trajectory (local curve) in space, which can be e.g. a circle or an ellipse at the scene distance from the imaging system.

If, now, e.g. by use of an eccentric drive, the total assembly is set into an oscillating motion e.g. in vertical direction to the optical axis, it will be possible, provided that the amplitude of the oscillation is correct, to obtain the second image dimension. Further, the total assembly can be moved in two dimensions, e.g. for extending the size of the scene, wherein also this movement must be distinctly slower than the rotation of the subreflector.

The combination of a very fast movement of a small mass, i.e. the subreflector, and a relatively slow movement of a considerably larger mass, i.e. the total assembly, makes it possible, in spite of a fully mechanized movement, to achieve a high image rate (e.g. $\geqq 1$ Hz) together with a high spatial resolution (e.g. $\leqq 0.5°$) and sensitivity (e.g. $\leqq 1$ K). For a sufficient size of the scene, only a minimum of receivers is required, e.g. only one receiver. Fully polarimetric operation is easily possible. Image generation can be performed without problems and with a mere minimum of residual errors, and the system is easily calibrated. These advantages can be achieved with extremely low expenditure with regard to costs and hardware, with low power consumption and with a low total mass.

The present invention is distinguished by use of a fast-rotating miniaturized motor for generating the rotary movement of a likewise small-sized subreflector of any desired suitable shape, in connection with a second, distinctly slower movement of the whole directional antenna array consisting of a suitable primary radiator or primary radiator assembly, a rotating subreflector and a suitable, distinctly larger main reflector of random shape, for fast two-dimensional imaging by means of electromagnetic waves while using a minimum of receivers.

In the present invention, for achieving high image rates, it is only the subreflector, which can be of a small-sized and light-weighted design, which has to be rotated at a high speed. The much larger-sized total array can be moved at a much lower speed, thus considerably reducing the mechanical problems caused by mass inertia in case of high resolutions which require a large main reflector. Further, thereby, a high image rate can be achieved by use of merely one receiver or a minimum of receivers (primary radiators). In this approach, in contrast to the state of the art, a merely low requirement with respect to technical expenditure is combined with the achievement of a high image quality.

The miniaturized motor used as said first drive means does not itself cause a shading of the path of rays because it is largely or even completely located in the subreflector's shade region which exists anyway.

By the suitable combination of the shape of the main reflector, the shape of the subreflector, the feed antenna, the distance between feed antenna and subreflector and the distance between subreflector and main reflector, an optimal focusing of the imaging unit can be set for a given scene distance. The focusing can be situated both in the near field and in the far field of the total assembly. The term "focusing" in the present context is meant in the sense that, in a small volume element, the whole bunch of rays has the highest density (focusing spot) in the scene distance and that the electrical path lengths of the rays from the feed antenna to the volume element are nearly identical. Simultaneously, with the aid of the above mentioned combination procedure, also the size of the field of view can be set in the process and be optimized. The manifold combinability allows for a high degree of adaptability of the inventive device concept to a large variety of demands.

Further, the contribution of the total assembly to the system noise can be reduced to a minimum since, as a result of the specific beam guidance geometry, the electromagnetic waves will pass only through air and have to be reflected on high-grade metallic structures.

Use of fully polarimetric receivers is possible without restrictions because no polarizing elements are provided in the total assembly.

The movement of the overall assembly effected by the second drive means can be carried out either by an eccentrically generated tilting movement, i.e. a change of angle of the optical axis, or by a linear translatory movement in a direction vertical to the optical axis. This will be useful e.g. particularly for distortion-free imaging in the near field. Also a movement of the total assembly in two dimensions is easily possible.

The mechanical decoupling of fast rotation of the subreflector and distinctly slower movement of the total assembly by using a first and a second drive means will be effective to prevent mechanical difficulties which in such a combination of movements would otherwise occur on the selfsame constructional element. Thus, the inventive separation of movement drive means will also allow for high image rates in case of large mechanical designs, i.e. also for low frequencies.

When use is made of a plurality of receivers or partial systems, their primary radiators can be in such a manner arranged symmetrically around a central primary radiator located in the optical axis that each of the primary radiators will illuminate the subreflector optimally. As a consequence of this deviation from the optical axis, each individual antenna diagram of the total assembly will describe its own trajectory over the scene, which trajectories will however overlap in a common region.

In this region, the signal/noise ratio (sensitivity) of the imaging system can be further improved in correspondence to the number of receivers and respectively the number of partial systems, e.g. by averaging. In the geometrical design of the total assembly, the use of a plurality of primary radiators will have to be considered correspondingly, so as to optimize the focusing and the size of the field of view for all partial systems together with regard to the scene distance. It can also be provided that the individual receivers will pick up only partial images of the scene, which may reduce the time length of image pick-up, for instance.

Since the local curves of the focusing spot in the scene can be determined and thus will be known, the obtained image data can be conveniently picked up in synchronism with the position, e.g. using a data acquisition card (A/D converter) and a measurement computer, and the image data be stored and—online or offline—be united into an image and be represented or be further processed. Thus, the residual image errors can be reduced to a minimum because each receiver will produce a complete image on its own so that, for improving the sensitivity, it is sufficient to perform a simple, positionally correct averaging of all images.

By the configuration of the imaging geometry, a simple calibration process is possible both externally and internally because only a minimum of receivers is required, each of them picking up a complete image. External calibration can be performed e.g. via one or a plurality of reference objects of known intensity, which will include the whole imaging system. Internally, it is possible, directly after the primary radiator, to switch over—by use of a switch means—onto one or a plurality of reference sources, thus detecting and taking into consideration the mostly dominating influence of the receiver.

The irregular scanning and the non-uniform density of the scanning values in the scene, as caused by the image pick-up principle, can be brought—by positionally correct averaging (weighted or non-weighted)—onto a regular grid in units of the spatial resolution cell, in the same way as is to be performed for image reconstruction and image generation, respectively. Thereby, it is also made possible to improve, at least partially, the radiometric resolution in the image.

The use of a dual-frequency and respectively multi-frequency feed horn as a primary radiator in the primary radiator assembly further allows for simultaneous operation with two or more distinctly different operational frequencies. Thereby, it is rendered possible to perform a simultaneous and geometrically similar detection of physically different effects which can markedly increase the information content. Using the device according to the present invention, this will of course be feasible without problems in situations where the laws of geometric optics still dominate the radiation balance. In other situations, the validity has to examined for the individual case. In no case, one would have to expect a complicated or also strong dependency on the frequency, and no dispersion either, since the operation is based virtually only on reflection on metallic structures.

The imaging method can be employed both for passive (radiometry) and for active remote investigation (radar technology). It will be merely required to connect the corresponding device (radiometer receiver or radar transmitter/receiver unit) to the primary radiator assembly. The signal propagation time (maximum distance) for the radar has to be selected to the effect that the echo will still be received within the dwelling time of the focusing spot on a scene point.

Possible applications of the device of the present invention exist in the whole remote investigation sector which requires two-dimensional imaging with high image rate and high image quality. In remote investigation, two main fields of application can be distinguished, namely earth observation and safety technology.

In the field of earth observation, the use of devices configured according to the present invention is to be seen primarily in ground-based measuring systems and application in aviation. Thus, in applications for measurement on the ground, scenarios which undergo rapid changes over time can be detected by measurement technology and respectively be imaged over a long time.

In applications on the aviation sector, possible uses of the invention include, on the one hand, large-area cartographic mapping of terrains, e.g. for geo-physical purposes or all-weather reconnaissance, while, on the other hand, the inventive device can also be used as a navigation aid in bad weather for obstacle warning and during approach for landing. Use on a satellite is possible as well, since there is needed only one fixed main reflector which, for this reason, is allowed to be very large (no spatial resolution) and does not require high mechanical stiffness (light-weighted design).

On the sector of safety technology, the device proposed by the invention can be used e.g. as a monitoring device for protection of critical infrastructures (e.g. all-weather 24 h-monitoring of external plants) since this application requires a very large spatial resolution with moderate image rate. Further possible is a use as a detection system for detection of visually hidden objects at portals or entrances, e.g. for safety checks performed on persons.

Detection systems of the above type require a high image rate, a high spatial resolution in the near field and a sufficient penetration depth of the radiation. The principle proposed by the present invention is attractive due to its simplicity, its low costs and its various capabilities which, on the side of safety personnel who are in need of a large number of systems of this type, would be desired as an upgrade of existing systems.

Advantageous and useful embodiments, modifications and possible applications of the invention are defined in the subclaims related directly or indirectly to claim 1.

BRIEF DESCRIPTION OF THE DRAWINGS

The device according to the present invention will be explained hereunder with reference to the drawings. In the drawings, the following is shown.

DESCRIPTION OF THE INVENTION

Figure 1:
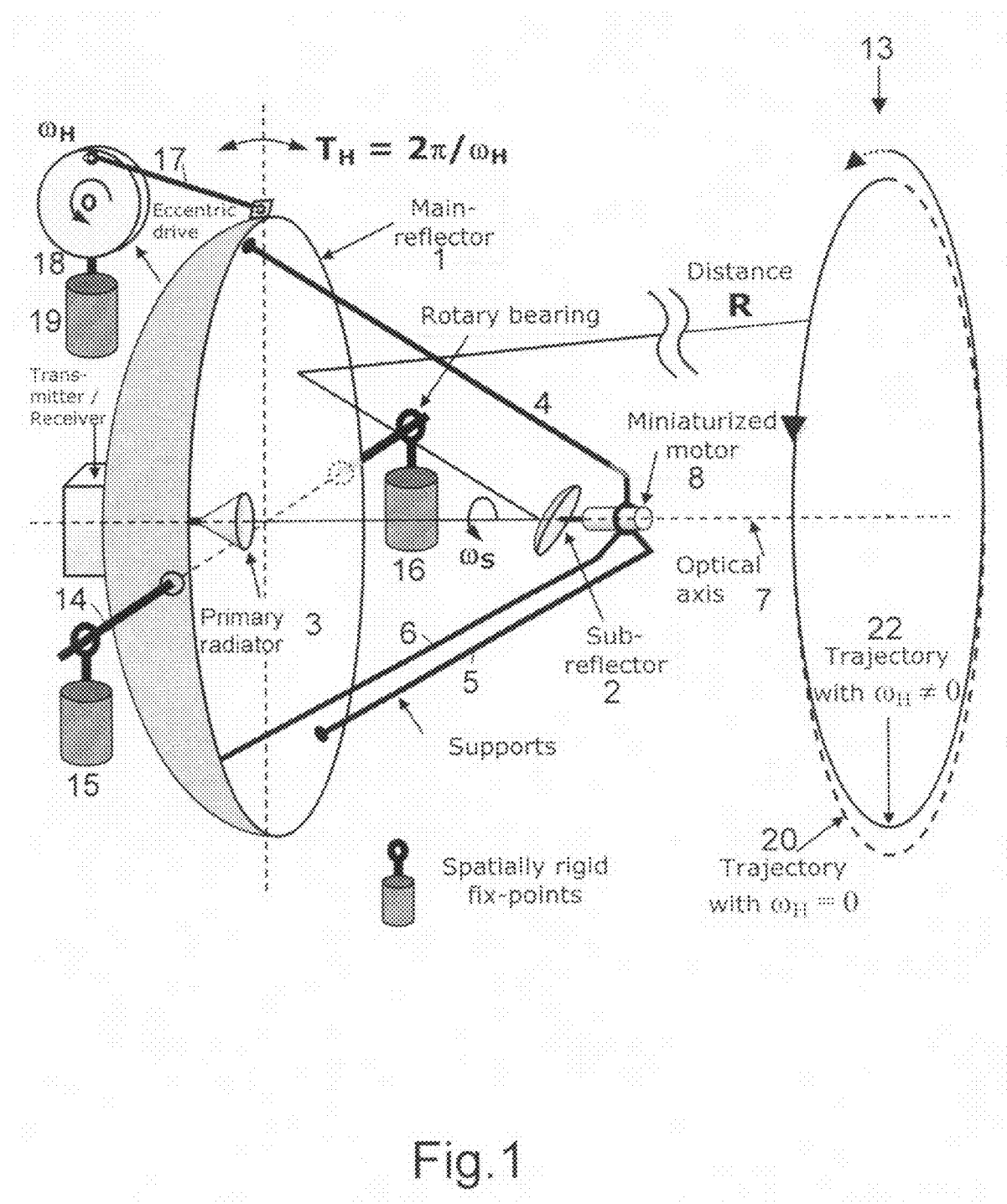
FIG. 1 is a schematic oblique view of an embodiment of a directional antenna arrangement for the inventive device for two-dimensional imaging of a scene.

FIG. 1 illustrates an embodiment of a directional antenna arrangement to be used for a device according to the present invention which is configured for fully mechanized scanning and is provided for two-dimensional imaging of a scene. The directional antenna arrangement of FIG. 1, which is used as a focusing optics for electromagnetic microwaves, comprises a combination of a main reflector 1, a subreflector 2 arranged for rotary movement, and a primary radiator 3. The combination of these three assemblies will be referred to hereunder as the total assembly.

The main reflector 1 is substantially configured with rotational symmetry, which is also the case for the subreflector 2 held attached to main reflector 1 by means of three supports 4, 5 and 6. Primary radiator 3 is arranged in the optical axis 7 of the total assembly which coincides with the axis of symmetry of main reflector 1. Subreflector 2 has small dimensions relative to main reflector 1. The axis of symmetry of subreflector 2 is inclined relative to the optical axis 7 of the directional antenna arrangement. For performing a rotary movement of subreflector 2 inclined relative to the optical axis 7 of the directional antenna arrangement, which movement is to occur at the vertex of subreflector 2 around optical axis 7 of the directional antenna arrangement, a fast-rotating miniaturized motor 8 is provided in the shaded region of subreflector 2 so that no beam shading will be generated in the path of rays.

Figure 2:
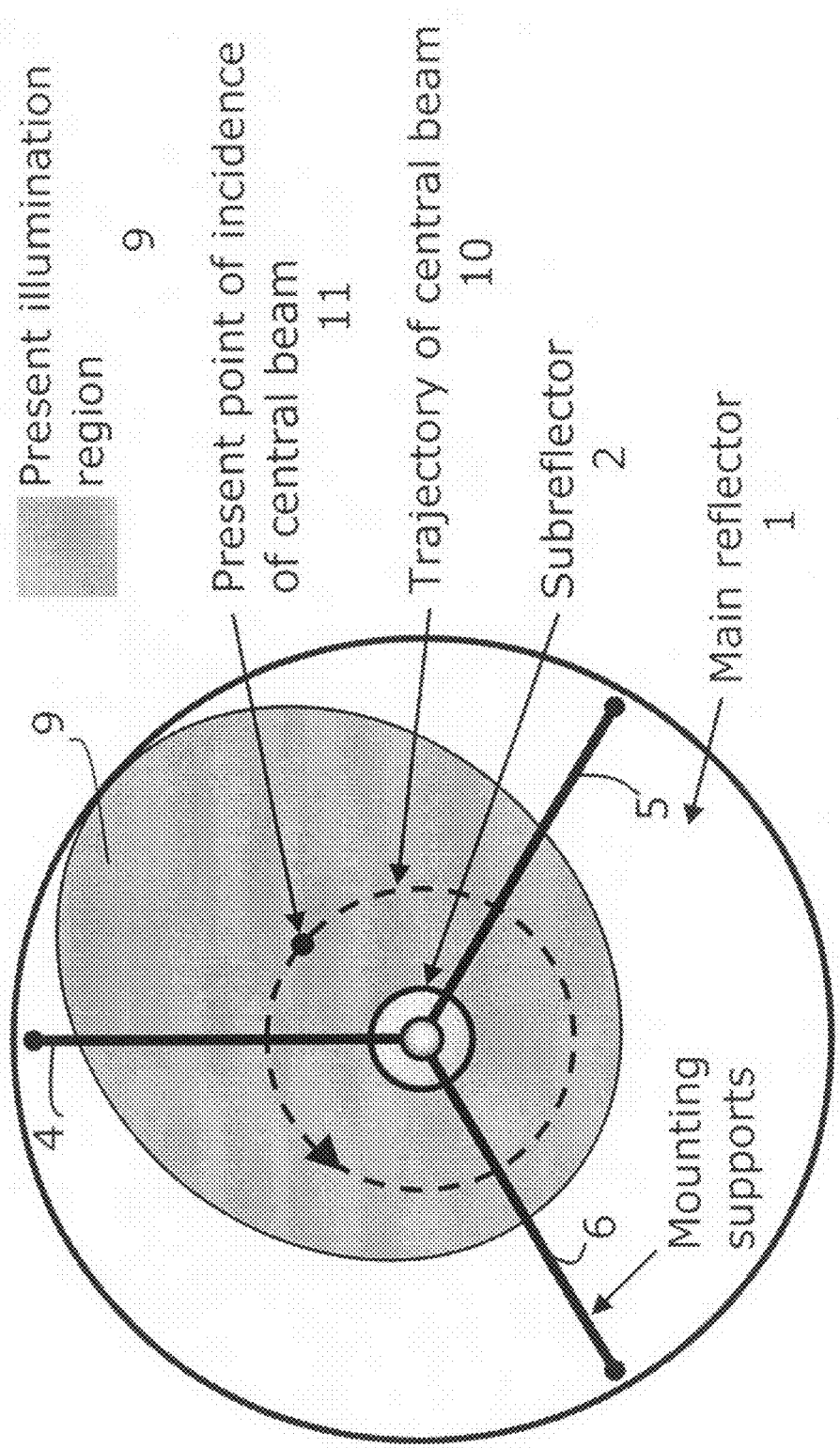
FIG. 2 is a front view of the directional antenna arrangement of FIG. 1, showing the illumination region on the main reflector and the trajectory of the central beam.

As evident from the frontal view of the total assembly as depicted in FIG. 2, the rotary movement of subreflector 2 will have the result that the illumination region 9—marked by cross-hatched lines—on main reflector 1 under-goes a change of position, i.e. will also be rotated, which is made possible by the rotational symmetry. Shown in FIG. 2 are the current illumination region 9 on main reflector 1 and the circular local curve, also referred to as a trajectory 10, of the central beam, along which the illumination region 9 is moving. Reference numeral 11 indicates the present point of incidence of the central beam, which is effective for the present illumination region 9 illustrated herein. In this context, it is to be noted that the illumination region 9 does not necessarily have to be a circle and that, further, the point of incidence 11 of the central beam does not need to be located centrally in the illumination region 9.

Due to the rotary movement of subreflector 2 with an angular frequency $\omega_S$, the antenna diagram of the total assembly will also describe a trajectory (local curve) 20 in space, which trajectory can be a circle or an ellipse. This aspect is also visualized on the upper left of FIG. 3. On the upper left of FIG. 3, there is shown in particular that trajectory 20 of a focusing spot 12 in the scene distance R which is generated exclusively by rotation of the subreflector. The scene is here defined in a scene plane, i.e. in a plane in which all of the imaged scene details are virtually located and for which the optimum focusing, i.e. the smallest focusing spot area, has been set.

By means of an eccentric drive, the directional antenna arrangement shown in FIG. 1 is caused to perform an oscillating deflection movement in a direction vertical to optical axis 7. By this measure, provided that the amplitude of the deflection is suitable, there is obtained a second image dimension as illustrated on the lower left of FIG. 3. In the embodiment according to FIG. 1, the whole directional antenna arrangement with main reflector 1, subreflector 2 and primary radiator 3 will be tilted in an oscillatory manner, i.e. be luffed, about a horizontal pivoting axis 14 supported on two spatially rigid fix-points 15 and 16.

The eccentric driving is performed by a rod 17 which on one of its ends is articulated to the upper region of main reflector 1, while the other end of rod 17 is eccentrically pivoted to a disk 18 driven by a small electric motor. Said disk, arranged on a spatially rigid fix-point 19, will rotate with an angular frequency $\omega_H$. The total period for a tilting process will then be $T_H=2\pi\omega_H$.

Neither the small electric motor for driving said eccentric disk 18 nor the miniaturized motor 8 for generating the rotary movement of subreflector 2 will cause a shading effect in the path of rays. The miniaturized motor 8 is for the largest part or even fully located in the shadow region of subreflector 2, which exists anyway.

It is of importance that the drive for the subreflector rotation and the drive for the movement of the total assembly are designed to the effect that the moving speed of the subreflector relative to the moving speed of the total directional antenna arrangement is very high.

Thus, in the total assembly shown in FIG. 1, the beam generated by the primary radiator 3 will be deflected, via subreflector 2 which is quickly rotating with an angular frequency $\omega_S$, onto the main reflector 1 and from there, beyond a distance R, will reach the scene 13 which is to be imaged. Together with the tilting movement of the total assembly which is generated by the eccentric drive operated with the angular frequency $\omega_H$, a two-dimensional illumination of the scene is achieved. This applies for transmitting and receiving operations alike.

It is to be noted here that the movement of the total assembly can also be realized, in lieu of using the above described tilting movement, by a translatory linear movement. Basically, the total assembly can also be moved in two dimensions transversely to the optical axis 7.

Figure 3:
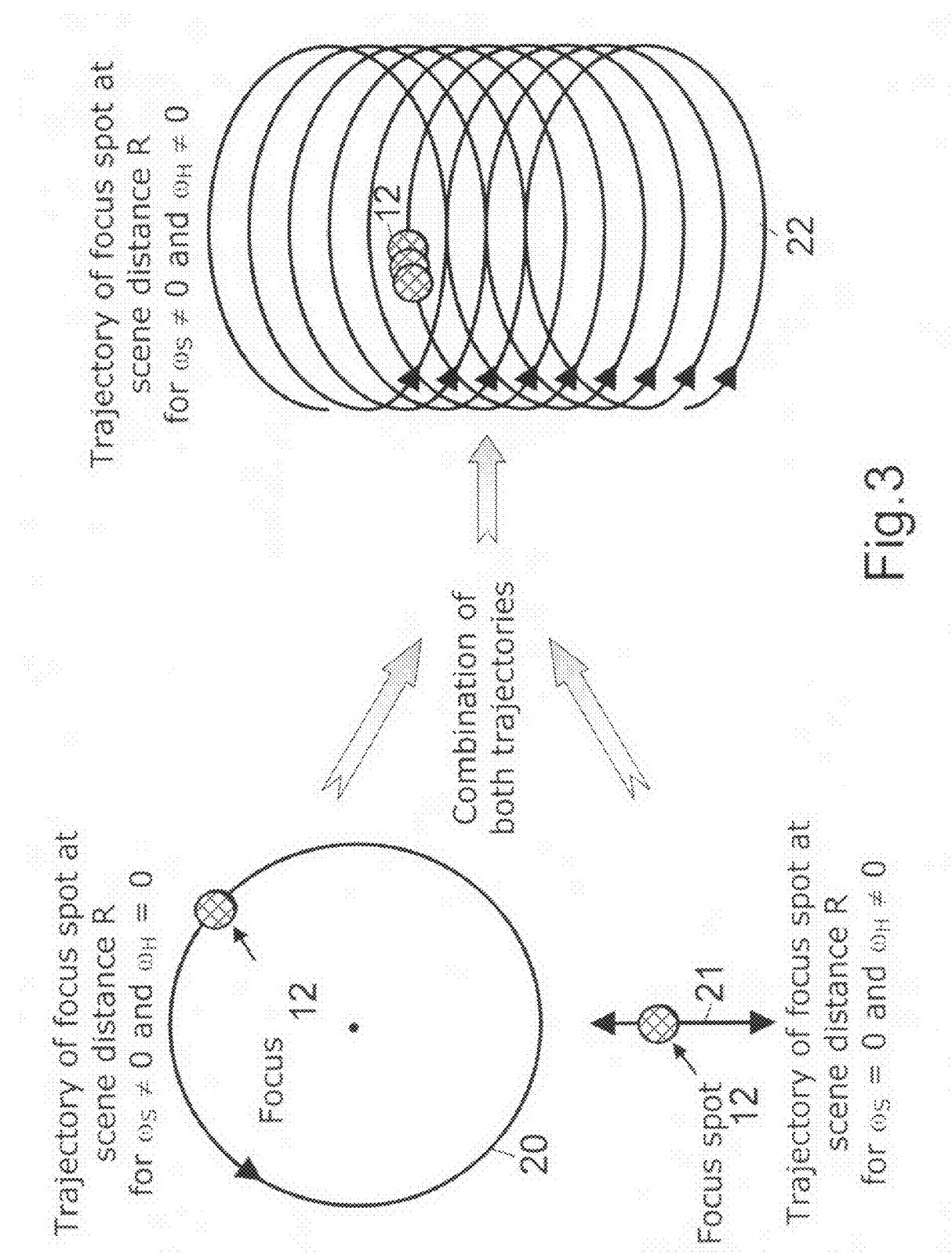
FIG. 3 illustrates, in the example on the upper left, that trajectory of a focusing spot in the scene distance which is generated only by rotation of the subreflector; in the example on the lower left, that trajectory of a focusing spot in the scene distance which is generated only by movement of the whole directional antenna arrangement; and, in the example on the right-hand side, the trajectory of a focusing spot in the scene distance which is generated by a combination of these two trajectories.

FIG. 3 illustrates on the right-hand part thereof the combination, obtained by the directional antenna arrangement shown in FIG. 1, of the two trajectories of the focusing spot 12 at the scene distance R as depicted on the left in FIG. 3, wherein, on the upper left, there is shown the trajectory 20 of the focusing spot 12 as generated by the rotary movement of subreflector 2 with the angular frequency $\omega_S$ ($\omega_S\neq 0$; $\omega_H=0$) at the scene distance R, and, on the lower left, the trajectory 21 of the focusing spot 12 as generated by the tilting movement of the total assembly with the angular frequency $\omega_H$ ($\omega_H\neq 0$; $\omega_S=0$) at the scene distance R.

Thus, for the combined trajectory 22 of the focusing spot 12 in FIG. 1 and on the right-hand side in FIG. 3, there apply $\omega_H\neq 0$ and $\cos\omega_S\neq 0$. Basically, the vertical movement of the focusing spot 12 generated by the tilting movement with the angular frequency $\omega_H$ could also be generated by a translatory linear movement, transversely to the optical axis 7, of the total assembly at the speed $V_H$.

The shape of main reflector 1, the shape of subreflector 2, the primary radiator 3, the distance between primary radiator 3 and subreflector 2 and the distance between subreflector 2 and main reflector 1 are attuned to each other as focusing parameters in such a manner that an optimum focusing and an optimum size of the field of view are achieved for a given scene distance R.

Said focusing parameters and the moving speeds of the two drive means determined by the angular frequencies $\omega_H$ and $\omega_S$ are set in a manner allowing for a gapless continuous scanning of the scene by the focusing spot 12, the latter moving at the scene distance R in the trajectory 22 which is at least approximately shaped as a twisted cycloid.

Figure 6:
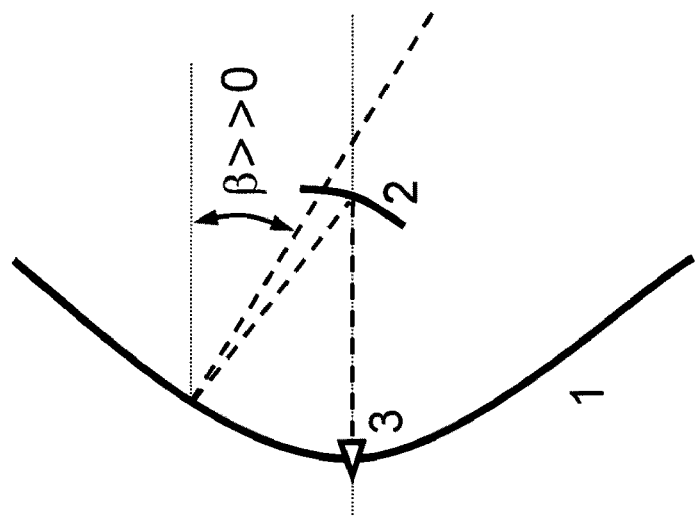
FIG. 6 is a schematic lateral view of a second possible setting of the directional antenna arrangement for generating a desired size of the field of view in the scene distance.
Figure 5:
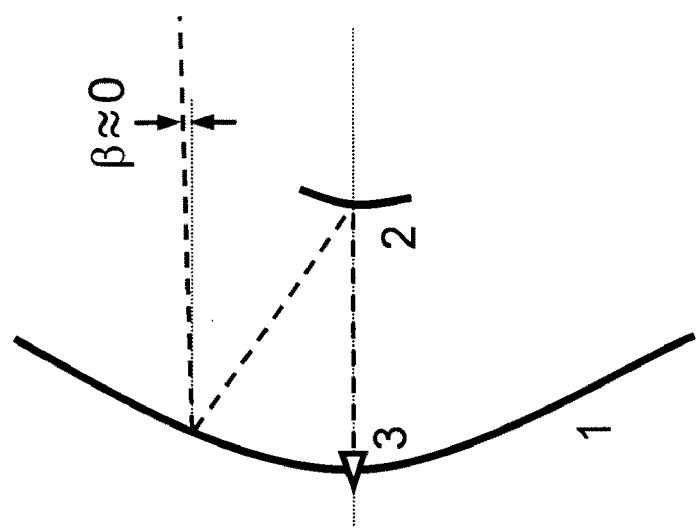
FIG. 5 is a schematic lateral view of a second possible setting of the directional antenna arrangement for generating a desired size of the field of view in the scene distance.
Figure 4:
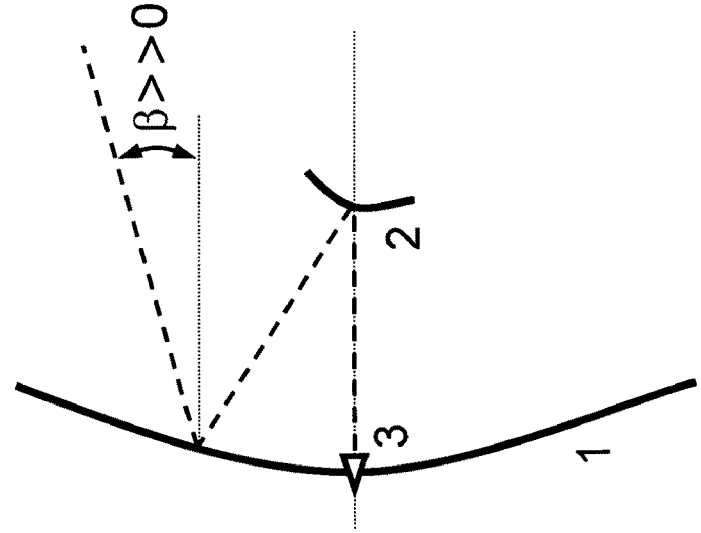
FIG. 4 is a schematic lateral view of a first possible setting of the directional antenna arrangement for generating a desired size of the field of view in the scene distance.

FIG. 4, FIG. 5 and FIG. 6 illustrate possible settings for generating a desired size of the field of view at a distance R from the to-be-imaged scene to the imaging system with main reflector 1, subreflector 2 and primary radiator 3. Each of these Figures schematically shows, in lateral view, the main direction of view under an angle β, in which direction the optimal focusing at the distance R is obtained, wherein, normally, not all participating paths of rays need to extend in the same direction. Thus, the image rate can be set via the angle β, with the image height being predefined by the maximum vertical tilting angle and respectively by the maximum length of a linear vertical movement. Near-field operation can also be performed with β≈0.

Two concrete examples of possible uses of the inventive device for two-dimensional imaging of scenes will be explained herein below under the computational aspect. The first example pertains to a system for safety checks to be performed on persons, and the second example pertains to a system for satellite-based earth observation.

Case 1: Safety Check of Persons:

The following specifications are assumed for the system design:

| | |
|---|---|
| Central frequency: | $f_0$ = 90 GHz, |
| System band width: | B = 5 GHz, |
| System noise temperature: | $T_{sys}$ = 800 K, |
| Angular resolution in the E- and H-plane: | $\Delta\Theta_E = \Delta\Theta_H = \Delta\Theta$ = 0.5°, |
| Distance of the focal plane (scene): | $R_0$ = 3 m, |
| Size of scene, height × width: | $\Theta_H$ = 41°, $\Theta_B$ = 20°, |
| Overlapping factor: | u = 0.1, |
| Scanning factor: | s = 0.5, |
| Time required per image: | $T_{image}$ = 1 s. |

The overlapping factor indicates the extent to which successive resolution cells shall overlap each other; thus, in case of u=0, there is no overlap at all; at u=1, the overlap would be 100%, and the antenna lobe would not move any further so that no imaging would be possible. At u=0.1, consequently, the overlap would be 10%.

The scanning factor indicates by how many resolution cells the antenna lobe is allowed to move on within the integration time. The integration time indicates how long the measuring signal is allowed to continue to be integrated for noise reduction.

Further, it is assumed here that the total assembly performs an oscillatory movement (tilting movement), i.e. the image dimension in the vertical direction, which is to say the image height, will be characterized by a sinusoidal path development and cosinusoidal speed development, with a complete image being generated in half a period.

The spatial resolution in the focal plane (scene) can be estimated in the following manner, wherein the predefined angular resolution, although to be considered as a near-field value, is approximately used as in case of the far field.

$$\Delta x_{GH} = R_0 (\tan[0.5(\Theta_B + \Delta\Theta)] - \tan[0.5(\Theta_B - \Delta\Theta)]),$$

$$\Delta x_{KH} = 2R_0 \tan(\Delta\Theta/2)/\cos(\Theta_B/2). \quad (1a, b)$$

Thus, for the large and for the small half-axis (GH und KH) of the resolution ellipse projected in the scene, values of about 2.6 cm to 2.7 cm are obtained. The height and the width of the scene can be calculated as follows:

$$W_H = 2R_0 \tan(\Theta_H/2), W_B = 2R_0 \tan(\Theta_B/2) \quad (2a, b)$$

and there are obtained values of 2.24 m and 1.06 m, which is sufficient for the imaging of a person at a distance of 3 m. For the required maximum scanning speed of the resolution ellipse in the vertical direction, a value of about 1.73 m/s will be obtained on the basis of $$v_{H,max} = 0,5(\Theta_H - \Theta_B) \frac{\pi}{T_{image}} R_0 \quad (3)$$

Further, the maximum allowable distance of two vertical resolution cells in the central position of the tilting movement can be estimated by $$dy_{max} = (1-u)\Delta x_{GH} \quad (4)$$

and will be about 2.43 cm. Now, from the above equations (3) and (4), the maximum time requirement for a subreflector rotation can be calculated as follows:

$$T_{rot} = dy_{max}/v_{H,max}, \quad (5)$$

and will be about 14 ms. From this, the required rotational speed can be estimated to be about 4272 U/min, and the scanning speed of the resolution ellipse within the rotation, at the middle position of the tilting movement, will be calculated according to $$v_{rot} = \frac{\pi W_B}{T_{rot}} \quad (6)$$

and will thus be 237 m/s. Now, if the maximum distance between two independent scans within the rotation for the middle position of the tilting movement can be calculated, according to $$dx_{max} = s(1-u)\Delta x_{KH} \quad (7)$$

to result in about 1.17 cm, the maximum allowable integration time can be calculated, on the basis of the relationship $$\tau_{max} = dx_{max}/v_{rot} \quad (8)$$

to result in a value of about 49 μs. As a consequence, the temperature resolution of a total-power radiometer, to be calculated on the basis of $$\Delta T = \frac{T_{sys}}{\sqrt{B\tau_{max}}} \quad (9)$$

will have a value of about 1.6 K for a scanning value. From the integration time, the number of measuring values to be detected simultaneously, and the desired bit depth of the analog/digital transformation, the required scanning frequency and the data rate can be obtained as follows:

$$f_{scan} = N_{measurement\ values}/\tau_{max}, n_{rate} = N_{bit}f_{scan}. \quad (10)$$

For instance, if three measurement values per scan with a resolution of about 16 bit have to be detected, this will result in a scanning rate of about 61 kHz and a data rate of about 120 kByte/s.

Figures 7, 8:
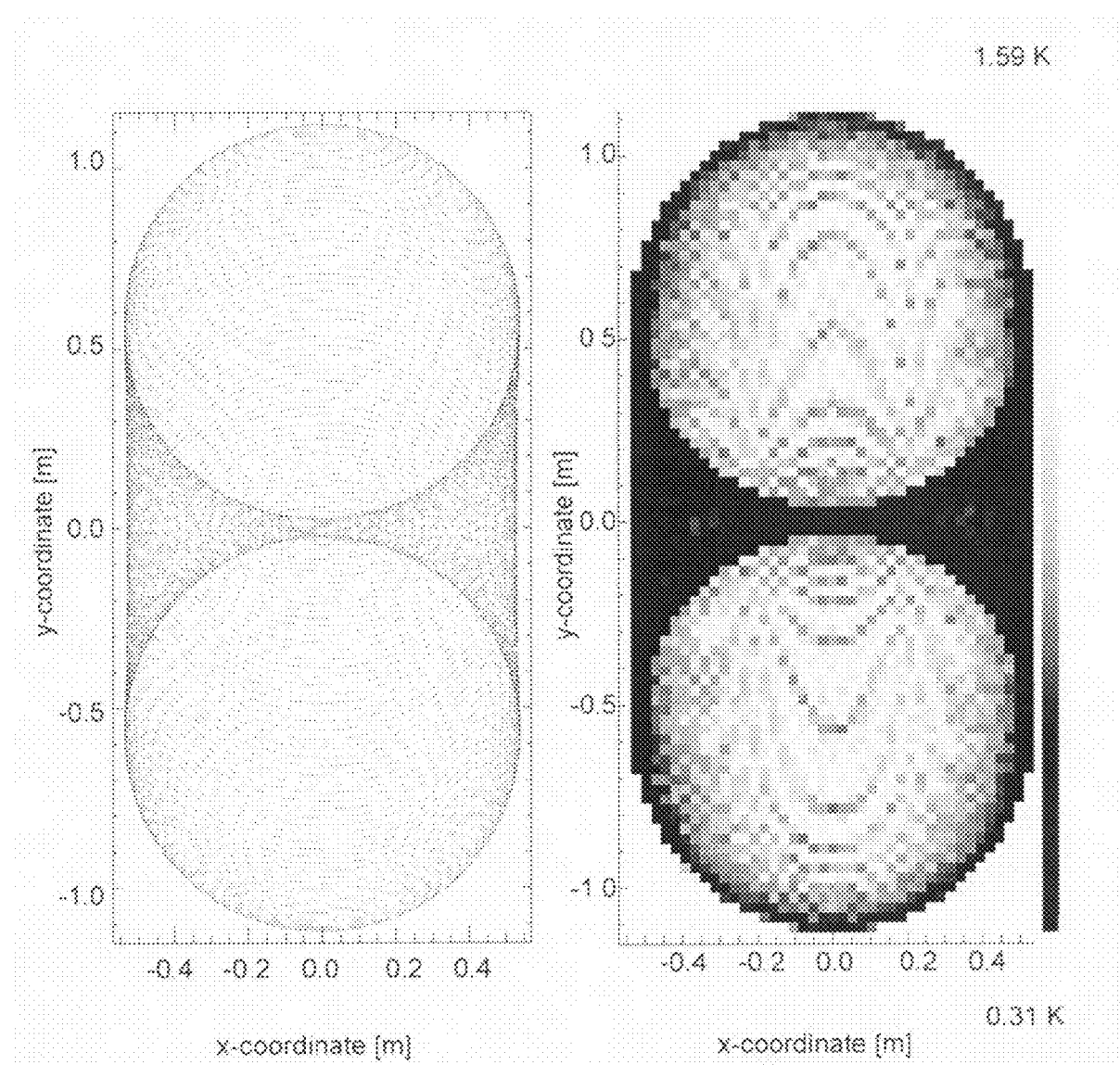
FIG. 7 illustrates a scanning grid for a scenario for safety checks performed on persons, wherein there was assumed, in addition to the rotation of the subreflector in the vertical direction, a sinusoidal tilting movement.
FIG. 8 illustrates, in connection with FIG. 7, the improvement of the temperature resolution in dependence on the scanning density per resolution cell.

The calculated scanning grid for the assumed movement of the antenna lobe in the scene plane is illustrated in FIG. 7. In addition to the rotation of the subreflector, there was assumed a sinusoidal tilting movement in the vertical direction. The scanning points mark the sites where measurement values of the scene are detected.

As evident from the above example, the scanning density will vary in dependence on the site, and a plurality of scanning values will fall into a given resolution cell. Now, assuming a regular image grid in units of the resolution-cell size, the N scanning values in each grid cell can be averaged, and the temperature resolution for this cell is further improved by maximally $\sqrt{N}$.

The resulting temperature resolution for the calculated scanning grid is illustrated in FIG. 8. It can be seen that an additional improvement of the temperature resolution is possible virtually in the whole image area if the measurement data are combined into a regular grid, as is performed for image reconstruction. In large parts of the scene area, a value around 1 K or even a better value is achieved. The image plane in FIG. 8 was subdivided into a regular grid in units of the resolution cell, as is done also for image reconstruction.

Case 2: Earth Observation:

The following specifications are assumed for the system design:

| | |
|---|---|
| Central frequency: | $f_0 = 1.42$ GHz |
| System band width: | $B = 20$ MHz |
| System noise temperature: | $T_{sys} = 600$ K |
| Angular resolution in the E- and H-plane: | $\Delta\Theta_E = 0.7°, \Delta\Theta_H = 1.0°$ |
| Satellite height above the earth: | $R_0 = 750$ km |
| Size of scene (strip width): | $W_B = 1500$ km |
| Overlapping factor: | $u = 0.1$ |
| Scanning factor: | $s = 0.5$ |

It is provided that the angular resolution is smaller one direction than in the other so as to reduce the projection effect for the resolution cell on the surface of the earth. Thereby, a substantially circular resolution cell is generated, as often desired by data users.

The effect of the earth's curvature is neglected here, and a flat earth is assumed. In a more-detailed analysis, this aspect can be easily taken into consideration.

Only one desired strip width will be predetermined because the satellite is to pick up data in a continuous manner and the indication of an image length will thus be arbitrary. Thus, it will also not be possible to predefine a total time for an image since the satellite speed will be determined by the orbit. The orbit is to be nearly polar and circular.

For computation of the relevant system parameters, one can largely use the above equations related to safety checks performed on persons, possibly in modified form, if required. Concerning the equations, only those relations will be indicated hereunder which are helpful for better understanding.

The image and respectively strip width in angular degrees can be easily obtained geometrically according to the relation $$\Theta_K = 2\arctan\left(\frac{W_B}{2R_0}\right), \quad (11)$$

and in the present case will be 90°. Half this angle, i.e. 45°, will also exactly be the opening angle of the scanning cone which the antenna lobe shall describe due to the rotation of the subreflector.

The speed in the flight direction and in the center of the image of the resolution cell on the earth can be calculated, on the basis of $$v_{flight} = \Omega_{sat} r_{earth} \quad (12)$$

and will thus be 6.69 km/s, with the speed of circulation of the satellite being defined to be about 1.05 mrad/s through the orbit, and the earth's radius being defined to be about 6371 km. The duration of a circulation for one orbit is about 5980 s or 1 h 40 min.

The spatial resolution on the earth can be estimated on the basis of the equations indicated hereunder; in the present case, it is constant in each situation.

$$\Delta x_{GH} = R_0(\tan[0.5(\Theta_K + \Delta\Theta_E)] - \tan[0.5(\Theta_K - \Delta\Theta_E)]),$$

$$\Delta x_{KH} = 2R_0 \tan(\Delta\Theta_H/2)/\cos(\Theta_K/2). \quad (13a, b)$$

For the large half-axis and for the small half-axis of the resolution ellipse, the above equations will result in values of about 18.3 km and 18.5 km which, according to the preconditions, are roughly equal. The maximum allowable distance between two pixels can be calculated, on the basis of equation (4), to be about 16.5 km, and, according to equation (5), the maximum time for a subreflector rotation will be about 2.5 s, and the corresponding rotational speed will be 24.4 r/min. Thus, according to equation (6), the resolution cell will wander in the rotational direction over the earth's surface at about 1913 km/s, and, according to equation (7), the distance between two successive scans will be about 8.3 km/h.

With a maximally allowable integration time of about 4.3 ms according to equation (8), the temperature resolution for a total-power receiver will be about 2.0 K according to equation (9).

From equation (10), there will result a scanning frequency of about 918 Hz and a data rate of about 1.8 kByte/s if e.g. four measurement values per scan shall be picked up here.

Also in this case of earth observation, there is generated an irregular scanning grid with varying scanning density on the scene. In identical manner to the above explained example of safety checks performed on persons, it is also here possible to generate a regular grid in units of the resolution cell and to carry out a corresponding averaging of the measurement values.

Figures 9, 10:
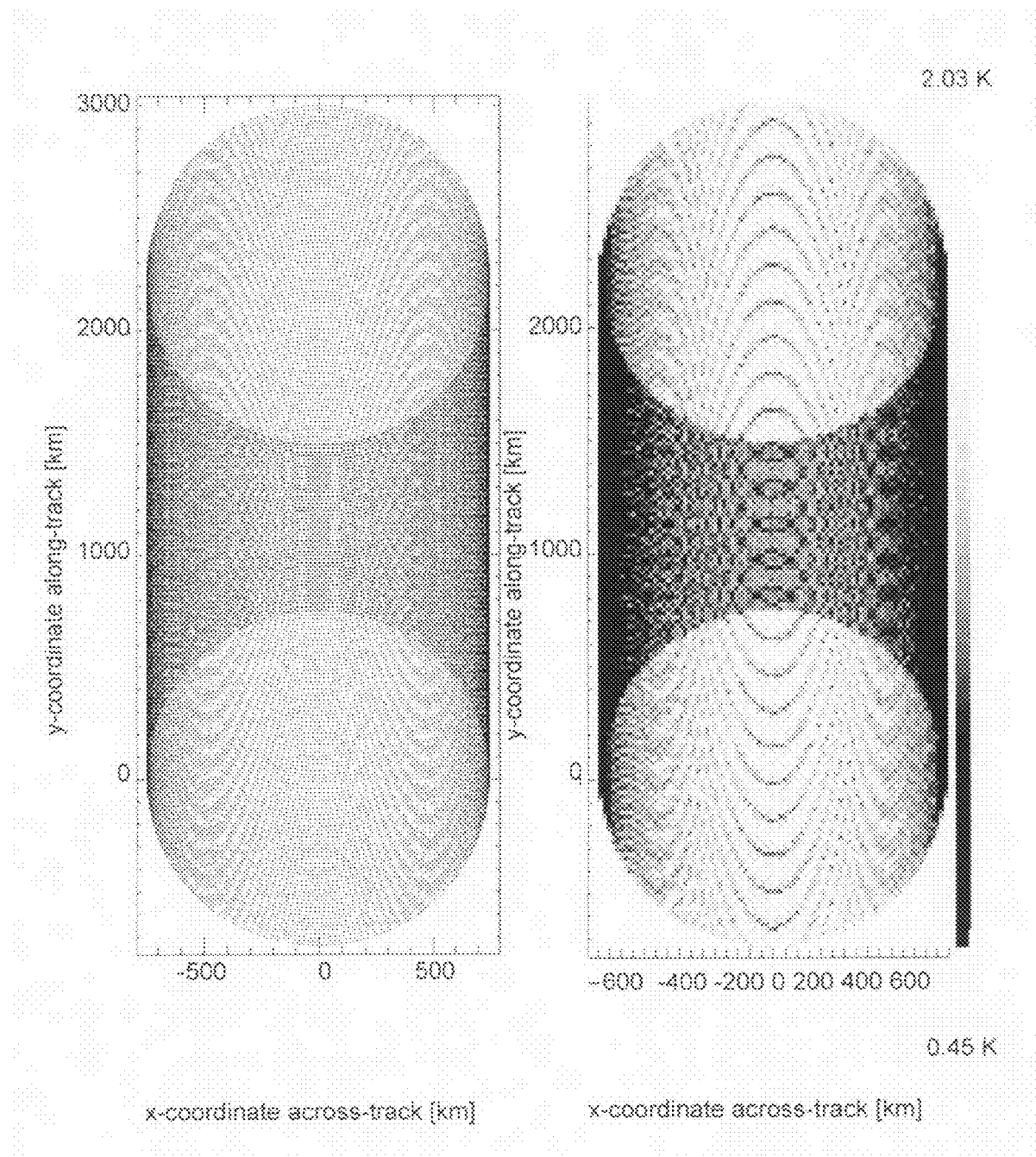
FIG. 9 shows a scanning grid for a scenario for earth observation, wherein there was assumed, in addition to the rotation of the subreflector, a constant satellite speed.
FIG. 10 illustrates, in connection with FIG. 9, the improvement of the temperature resolution in dependence on the scanning density per resolution cell.

In correspondence to the above, FIG. 9 shows the scanning grid for a scene length of nearly 4000 km. Here, in addition to the rotation of the subreflector, the satellite speed was assumed to be constant. The scanning points mark the sites where measurement values of the scenes were detected.

FIG. 10, being related to FIG. 9, illustrates the improvement of the temperature resolution in dependence on the scanning density per resolution cell. The image plane has been subdivided into a regular grid in units of the resolution cell, as is also done for image reconstruction. The darker area situated in the central part of FIG. 10 represents the normal state of operation in which the satellite is already in the phase of continuous data pick-up. In this range, it is even possible, for the largest part, to achieve a temperature resolution of about 1 K.

The herein described earth observation scenario illustrates, by way of example, a possible use of a method for measuring the bottom humidity and the surface salt content of the oceans, for which the protected frequency range of about 1.42 GHz is suited. The main reflector required for this purpose, having a large size (a diameter of 30-40 m) but being fixed, could be realized by means of foldable or inflatable structures. Present activities undertaken by ESA or NASA for this form of application are far from reaching the performance data described herein.

Further, by deflecting the axis of rotation from the nadir direction, e.g. by inclination of the whole satellite, it is possible to set a variety of angles of incidence, whereby additional information can be obtained.

Besides, the above application for use in a satellite can also be transferred to an application on an aircraft platform, e.g. of an airplane or a zeppelin.

The invention claimed is:

1. A device for two-dimensional imaging of scenes through continuous microwave scanning by use of a fully mechanized, movable reflector-type directional antenna array configured as a dual-reflector antenna, said reflector-type directional antenna array comprising a rotationally symmetrical main reflector, a primary radiator assembly including one or a plurality of primary radiators and being arranged in the symmetry axis of the main reflector, said symmetry axis coinciding with the optical axis of the directional antenna array, and said reflector-type directional antenna array further comprising a rotationally symmetrical subreflector having small dimensions relative to the main reflector and having a vertex, the symmetry axis of said subreflector being inclined relative to the optical axis of the directional antenna array, there being provided first drive means operative to cause said subreflector which is inclined relative to the optical axis of the directional antenna array, to rotate at a rotational speed around the vertex and about the optical axis of the directional antenna array, and second drive means operative to cause a movement of the whole directional antenna array in a direction at least approximately vertical to the direction of the optical axis of the directional antenna array at a translational moving speed, and there being provided, an evaluation unit for generating from the received microwaves an image of the scene having first and second image dimensions, wherein the shape of the main reflector (1), the shape of the subreflector (2), the primary radiator (3), the distance between the primary radiator (3) and the subreflector (2) and the distance between the subreflector (2) and the main reflector (1) as focusing parameters for passive or active microwave scanning are attuned to each other in such a manner that, for a given scene distance (R), a selected focusing spot area of the field of view is obtained and a size of the field of view is controlled, the two drive means (8;17,18) are configured relative to each other in such a manner that the rotational moving speed of the subreflector (2) is larger than the translational moving speed of the whole directional antenna array, the focusing parameters and the moving speeds of the two drive means (8;17;18) are set in such a manner that a gapless, continuous scanning of the scene (13) is obtained with the aid of a focusing spot (12) moving, at the respective scene distance (R), in a trajectory which is combined from a trajectory (20) resulting from the rotation of the subreflector (2) and a trajectory (21) resulting from the movement of the directional antenna array transversely to the optical axis thereof and which at least approximately has the shape of a twisted cycloid, and the evaluation unit is configured in such a manner that, in the evaluation unit, as a consequence of the determinability and thus of the knowledge of the trajectories of the focusing spot (12) in the scene, the obtained image data are picked up synchronously with the position and are stored and, online or offline, are unified into an image and are represented or further processed.

2. The device according to claim 1, wherein, for generating the rotary movement of said subreflector (2) having small dimensions relative to the main reflector (1), said first drive means (8) is realized in the form of a fast-rotating miniaturized motor located on the shadow side of the subreflector (2) and thus not in the path of rays.

3. The device according to claim 1, wherein the second image dimension is obtained using said second drive means (17,18), wherein said second drive means is realized in the form of an electromotoric drive with eccentric effect, which drive is operative to impart an oscillating movement to the whole directional antenna array in a direction at least approximately vertical to said optical axis (7) so that, if the amplitude of the deflection is suitable, the second image dimension is obtained.

4. The device according to claim 1, wherein said second drive means comprises electromotoric drives which are operative to move the whole directional antenna array transversely to the optical axis of the directional antenna array so that the size of the scene can be enlarged, said movements being slower than the rotary movement of the subreflector (2).

5. The device according to claim 1, wherein, in case that a plurality of receivers or partial systems are used, their primary radiators in the primary radiator array are in such a manner mounted symmetrically around a central primary radiator arranged in the optical axis and assigned to one of the receivers and respectively partial systems, that each of the primary radiators will illuminate the subreflector.

6. The device according to claim 5, wherein the geometric arrangement of the individual components of the whole directional antenna array comprising a plurality of primary radiators and thus generating mutually differing trajectories in the scanned scene, is configured in such a manner that the focusing and the size of the field of view for the totality of the partial systems assigned to respectively one primary radiator are controlled with regard to the scene distance.

7. The device according to claim 5, wherein a scanning order is provided which is designed to the effect that the individual receivers and respectively partial systems are operative to pick up only partial images of the scene which are unified into a total image of the whole scene.

8. The device according to claim 1, wherein, in case that a plurality of receivers and respectively partial systems are provided, an averaging device is arranged in the evaluation unit for a positionally correct averaging of the images generated by these receivers or partial systems into a final image.

9. The device according to claim 1, wherein an external calibration is performed via one or a plurality of reference objects of known intensity.

10. The device according to claim 1, wherein an internal calibration is performed by means of a switch via which, directly after the feed antenna, switching is performed onto one or a plurality of reference sources, thereby detecting and taking into consideration at least the mostly dominating influence of the receiver.

11. The device according to claim 1, wherein the evaluation unit on the receiver side includes an averaging device in which the irregular scanning and the non-uniform density in the scene, as caused by the image pick-up principle, can be brought, by positionally correct weighted or non-weighted averaging, onto a regular grid in units of the spatial resolution cell, in the same way as this also has to be performed for image reconstruction and image generation, respectively.

12. The device according to claim 1, wherein the primary radiator in the primary radiator array (3) is provided in the form of at least one multi-frequency feed horn radiator, the at least one multi-frequency feed horn radiator allowing for simultaneous operation with two or more different operational frequencies.

13. Use of a device provided according to claim 1 in the field of earth observation.

14. The use according to claim 13 in ground-based measuring systems for long-term detecting and imaging, by use of measurement technology, of scenes undergoing fast changes over time.

15. The use according to claim 13 in aircraft missions either for large-area cartographic mapping of terrains, e.g. for geophysical purposes or all-weather reconnaissance, or as a navigation aid in bad weather for obstacle warning and during approach for landing.

16. The use according to claim 13 on a satellite or aircraft, wherein, as a consequence of the uniform movement of the directional antenna array, replacing the movement of the directional antenna array transversely to the optical axis, with the directional antenna array arranged on the satellite or aircraft and being adapted to be oriented towards the surface of the earth, only one fixed main reflector is required which consequently is allowed to have a very large size, resulting in a high spatial resolution, and which does not need to have high mechanical stiffness and thus can be of a light-weighted construction.

17. Use of a device provided according to claim 1 in the field of safety technology.

18. The use according to claim 17 in a monitoring system for protection of critical infrastructures, e.g. in all-weather 24-h monitoring of external plants.

19. The use according to claim 17 in a detection system provided for detecting visually hidden objects at portals or entrances, e.g. for safety checks performed on persons.

* * * * *